(12) United States Patent
Trumble et al.

(10) Patent No.: US 6,531,074 B2
(45) Date of Patent: Mar. 11, 2003

(54) LUMINESCENT NANOPHASE BINDER SYSTEMS FOR UV AND VUV APPLICATIONS

(75) Inventors: Cathy Shaw Trumble, Newburyport, MA (US); Mary Ann Johnson, Rockport, MA (US)

(73) Assignee: Osram Sylvania Inc., Danvers, MA (US)

( * ) Notice: Subject to any disclaimer, the term of this patent is extended or adjusted under 35 U.S.C. 154(b) by 134 days.

(21) Appl. No.: 09/756,401

(22) Filed: Jan. 8, 2001

(65) Prior Publication Data

US 2001/0048966 A1 Dec. 6, 2001

Related U.S. Application Data

(60) Provisional application No. 60/176,242, filed on Jan. 14, 2000.

(51) Int. Cl.$^7$ .................... H01J 1/62; C09K 11/08; C03C 3/06; C03C 3/095
(52) U.S. Cl. ............... 252/301.4 R; 252/301.4 R; 313/486; 313/487; 427/67
(58) Field of Search ................ 313/486, 487; 252/301.4 F, 301.4 R; 427/67

(56) References Cited

U.S. PATENT DOCUMENTS 4,707,635 A  *  11/1987 Tateyama et al. .......... 313/466
4,798,681 A  *  1/1989 Oversluizen et al. . 252/301.4 F
6,313,578 B1  *  11/2001 Mishra et al. .............. 313/485

OTHER PUBLICATIONS

Konrad et al., Chemical Vapor Synthesis and luminescence Properties of Nanocrystalline Cubic $Y_2O_3$:Eu, *J. Appl. Phys.*, 86(6) (Sep. 1999) 3129–3133.

Sharma et al., Tailoring the Particle Size from $\mu m \rightarrow nm$ Scale by Using a Surface Modifier and Their Size Effect on the Fluorescence Properties of Europium Doped Yttris, *J.Luminescence*, 82 (1999) 187–193.

Goldburt et al., Size Dependent Efficiency in Tb doped $Y_2O_3$ Nanocrystalline Phosphor, *J.Luminescence*, 72–74 (1997) 190–192.

Bhargava, R.N., Doped Nanocrystalline Materials—Physics and Applications, *J.Luminescence*, 70 (1996) 85–94.

* cited by examiner

*Primary Examiner*—C. Melissa Koslow
(74) *Attorney, Agent, or Firm*—Robert F. Clark

(57) ABSTRACT

A luminescent nanophase binder is provided for use in UV and VUV applications. The binder promotes adherence of phosphor coatings to lamp envelopes and emits visible light under UV and VUV excitation. In a preferred embodiment, the binder comprises $SiO_2$ nanoparticles doped with terbium or terbium and yttrium. Preferably, the nanoparticles have a particle size of less than 50 nm.

20 Claims, 3 Drawing Sheets

LUMINESCENT NANOPHASE BINDER SYSTEMS FOR UV AND VUV APPLICATIONS

CROSS REFERENCES TO RELATED APPLICATIONS

This application is related to copending application Ser. No. 09/162,192 filed Sep. 28, 1998, now U.S. Pat. No. 6,313,578, and copending application Ser. No. 09/483,435 filed Jan. 14, 2000 both of which are incorporated herein by reference. This application claims the benefit of U.S. Provisional Application No. 60/176,242, filed Jan. 14, 2000.

BACKGROUND OF THE INVENTION

Phosphor coatings for lighting applications typically require a binder phase in the phosphor suspension to obtain adequate phosphor adherence to the lamp envelope. One such commonly used binder is Aluminum Oxide C (AOC) which is a gamma phase aluminum oxide having a particle size on the order of 20 nanometers. While this material effectively promotes phosphor adherence, it does not contribute to the light output of the lamp and is a strong absorber of vacuum ultraviolet (VUV) radiation.

Other nanophase materials such as $Y_2O_3$:Eu and $SiO_2$ have been evaluated as alternatives to Aluminum Oxide C in phosphor systems for VUV applications, particularly neon gas discharge lamps. These materials are described in copending applications Ser. Nos. 09/162,192 and 09/483,435. While these materials promote phosphor adherence, neither material was shown to emit visible light under VUV excitation and only the nanophase $Y_2O_3$:Eu exhibited a weak visible emission under ultraviolet (UV) excitation. As such, neither material is able to contribute to the light output of a lamp which relies primarily on VUV excitation of the phosphor.

Thus, it would be an advantage to provide a nanophase binder material which emits visible light under both UV and VUV excitation.

SUMMARY OF THE INVENTION

It is an object of the invention to obviate the disadvantages of the prior art.

It is another object of the invention to provide a binder which promotes adherence in phosphor coatings and which emits visible light under UV and VUV excitation.

It is a further object of the invention to provide a method for coating a lamp in which the binder may be added directly to the phosphor coating suspension.

In accordance which an object of the invention, there is provided a luminescent nanophase binder comprising nanoparticles of a luminescent glass which emit visible light under UV and VUV excitation. In one aspect of the invention, the luminescent nanophase binder comprises $SiO_2$ nanoparticles doped with terbium or terbium and yttrium.

In accordance with another object of the invention, there is provided a method for coating a lamp comprising forming a colloidal dispersion of $SiO_2$ nanoparticles doped with terbium or terbium and yttrium, combining the colloidal dispersion with a suspension of a phosphor, coating the suspension on the lamp, drying the coating, and firing the coating at a temperature sufficient to remove water and residual organic material.

DESCRIPTION OF THE PREFERRED EMBODIMENTS

Figure 1:
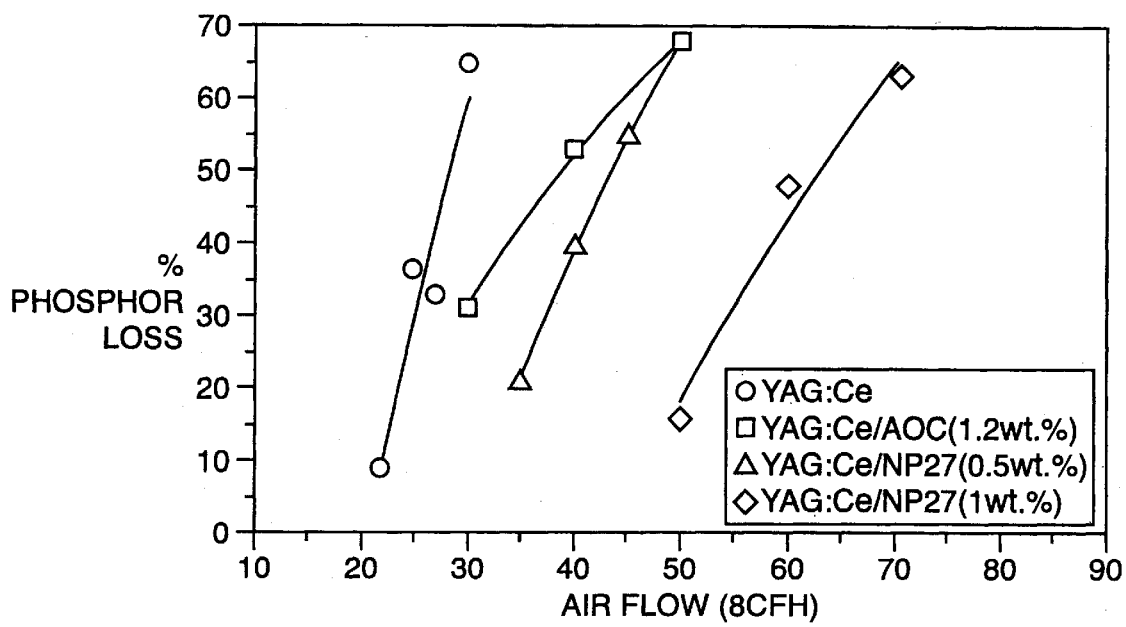
FIG. 1 is a graph showing the percentage of phosphor loss from various phosphor coatings as a function of air flow.

For a better understanding of the present invention, together with other and further objects, advantages and capabilities thereof, reference is made to the following disclosure and appended claims taken in conjunction with the above-described drawings.

A luminescent nanophase binder has been invented which comprises nanoparticles of a luminescent glass which emit visible light under UV and VUV excitation. In a preferred embodiment, the luminescent nanophase binder comprises terbium and terbium/yttrium co-doped $SiO_2$ nanoparticles having a particle size of less than about 100 nm. The doped nanoparticles emit light in the green region of the visible spectrum under both UV and VUV excitation. Co-doping the nanoparticles with yttrium significantly enhances the principally green emission from the $Tb^{3+}$ ions. In addition to their luminescent properties, the nanoparticles have been demonstrated to the promote adherence of phosphor coatings at levels comparable to other nanophase binders such as AOC.

The luminescent nanophase binder of this invention is produced using a modified Stöber sol-gel fabrication process under strongly basic conditions. As a consequence of using the sol-gel fabrication process, the luminescent nanoparticles can be processed at low temperatures, i.e., less than 1000° C. In particular, after the nanoparticles are formed in the sol-gel process, the luminescent nanophase binder is achieved by firing the nanoparticles at temperatures below the crystallization temperature of the material. This results in a non-crystalline (glassy) nanophase.

In a preferred method of this invention, terbium and yttrium precursors are dissolved in a mixture of ethanol, water and ammonia. Tetraethoxysilane (TEOS) is then added and the mixture is allowed to stand at room temperature for at least one hour to form a colloidal dispersion of the nanoparticles. Once the nanoparticles have been formed, the colloidal dispersion can be added directly to a phosphor suspension or it can be dried, fired and re-dispersed in an aqueous suspension for use. In either case, the nanoparticles must be heat-treated to remove water from the material's structure and residual organic material which can have a negative impact on the luminescent properties.

The preferred terbium and yttrium precursor materials are terbium and yttrium acetylacetonate. The materials were chosen based on the solubility requirements for the Stober process. The terbium and yttrium precursors are added at the desired dopant levels. The total amount of the Tb and Y precursor addition was limited by solubility of the acetylacetonates. The preferred dopant levels expressed as the oxides ranged up to about 4 mole percent (mol %) $Tb_2O_3$ and up to about eight mole percent $Y_2O_3$ in the $SiO_2$ nanoparticles.

It was observed that the particle size of the resulting luminescent nanophase binder decreased with increasing terbium and yttrium acetylacetonate concentrations. The particle size was also strongly influenced by the TEOS:$H_2O$:$NH_3$ molar ratio and the reaction temperature. For the most part, the molar ratio of TEOS:$H_2O$:$NH_3$ was fixed at a preferred ratio of 0.2:8:0.5 for nanoparticle fabrication. A loose powder having discrete nanoparticles was formed after the colloidal dispersion was dried and fired. Higher acetylacetonate contents in the dispersion required additional time to remove the organic component during the firing stage.

EXAMPLES

In a polypropylene beaker, 0.82 grams of terbium acetylacetonate and 1.19 grams of yttrium acetylacetonate trihydrate were dissolved in a mixture of 79 ml ethanol, 13.1 ml deionized water, and 3.3 ml $NH_4OH$ (15 M). A 4.5 ml amount of tetraethoxysilane (99.95+%) was then added and the mixture stirred for at least one hour at room temperature to form a colloidal dispersion. The resultant terbium/yttrium co-doped $SiO_2$ nanoparticles had a composition of 4 mole percent $Tb_2O_3$, 6 mole percent $Y_2O_3$, and 90 mole percent $SiO_2$ (NP27)

Other terbium and terbium/yttrium doped. $SiO_2$ nanoparticles having different dopant amounts were similarly made. Coatings were prepared with the as-made nanoparticle dispersions and a phosphor/nanoparticle suspension. In the latter case, the pH of the nanoparticle dispersion was reduced to a pH of about 9 by nitric acid additions prior to mixing with a suspension of a cerium-activated yttrium aluminum garnet (YAG:Ce) phosphor (OSRAM SYLVANIA Type 251). The properties of the phosphor coating mixtures were adjusted using polyethylene oxide additions.

Coatings were applied to the interior surface of 12-inch long, 3×5 mm glass tubes (Corning Type 1724) by a fill and drain process. The coatings were dried with flowing air at about 90° C. and fired in dry air at 600° C. for 30 minutes to burn out residual organic material. The firing of the coatings was continued under vacuum or nitrogen to 750° C. to minimize the amount of residual hydroxyl in the luminescent nanoparticles. Samples were prepared with 3–4 coats of the nanoparticle dispersion while YAG:Ce/nanoparticle coatings were prepared with two coats. The fired samples were stored in either argon or nitrogen.

The microstructure of a YAG:Ce/nanoparticle coating containing 1 wt. % of the luminescent $SiO_2$ nanoparticles (NP27, 4 mol % $Tb_2O_3$, 6 mol % $Y_2O_3$) was evaluated with a Field Emission Scanning Electron Microscope (FESEM). FESEM analysis demonstrated that the nanoparticles were evenly dispersed throughout the phosphor coating with minimal agglomeration. The good dispersion of the binder phase is believed to promote phosphor adherence to the glass envelope. Preferably, the particle size of the luminescent nanoparticles was less than 50 nm as determined by FESEM.

A modified blow test was utilized to evaluate phosphor adherence. The test measures the percentage of phosphor loss as a function of air flow. FIG. 1 shows the blow test results for YAG:Ce/co-doped $SiO_2$ nanoparticles (NP27, 4 mol % $Tb_2O_3$, 6 mol % $Y_2O_3$), YAG:Ce/AOC and YAG:Ce coatings. The weight percentage of the binder in the coating is indicated in the parentheses. The YAG:Ce/AOC(1.2 wt. %) coating represents the benchmark for adequate adherence in this application. Adequate phosphor adherence is demonstrated for 0.5–1 wt. % of the Tb/Y co-doped $SiO_2$ nanophase binder in the YAG phosphor system.

Figure 2:
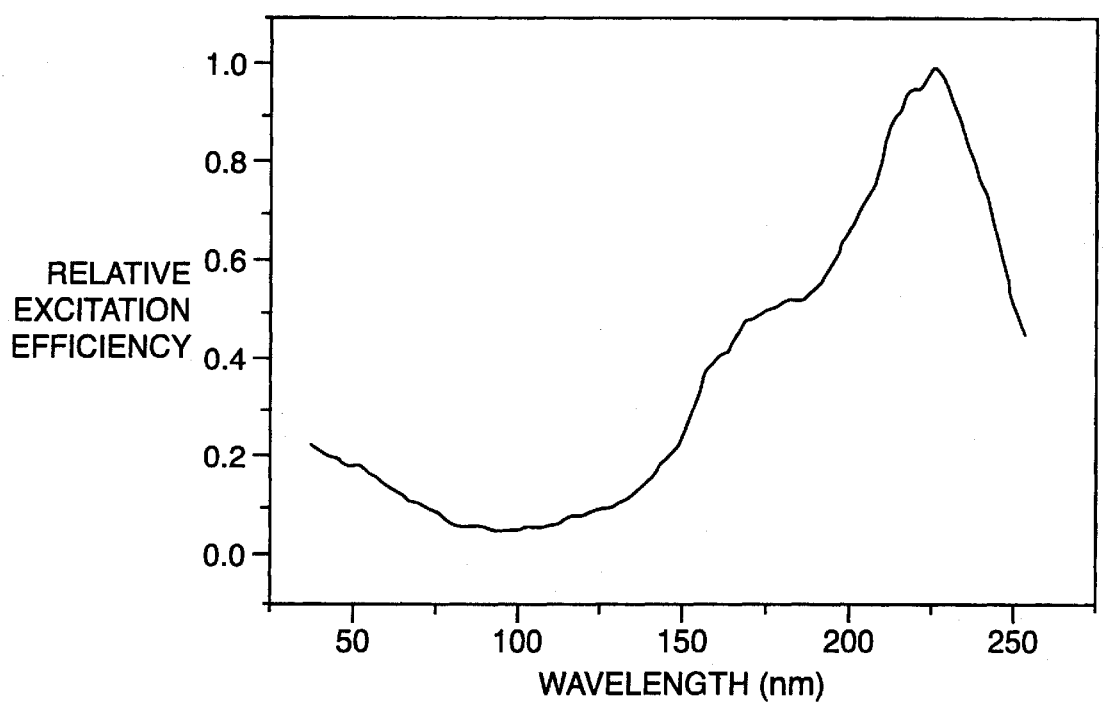
FIG. 2 is an excitation spectrum for Tb/Y co-doped $SiO_2$ nanoparticles.

The luminescent properties of the Tb and Tb/Y co-doped $SiO_2$ nanoparticles were evaluated using UV and VUV excitation energies. Referring to FIG. 2, the excitation spectrum of Tb/Y co-doped $SiO_2$ nanoparticles (4 mol % $Tb_2O_3$, 8 mole % $Y_2O_3$) was measured using a synchrotron radiation source. A maximum in excitation was observed around 230 nm with the excitation efficiency decreasing in the VUV region. In particular, the material displays moderate excitation in the VUV spectral region associated with xenon discharges (150–175 nm) and relatively lower excitation in the region of neon discharges (74 nm).

Figure 3:
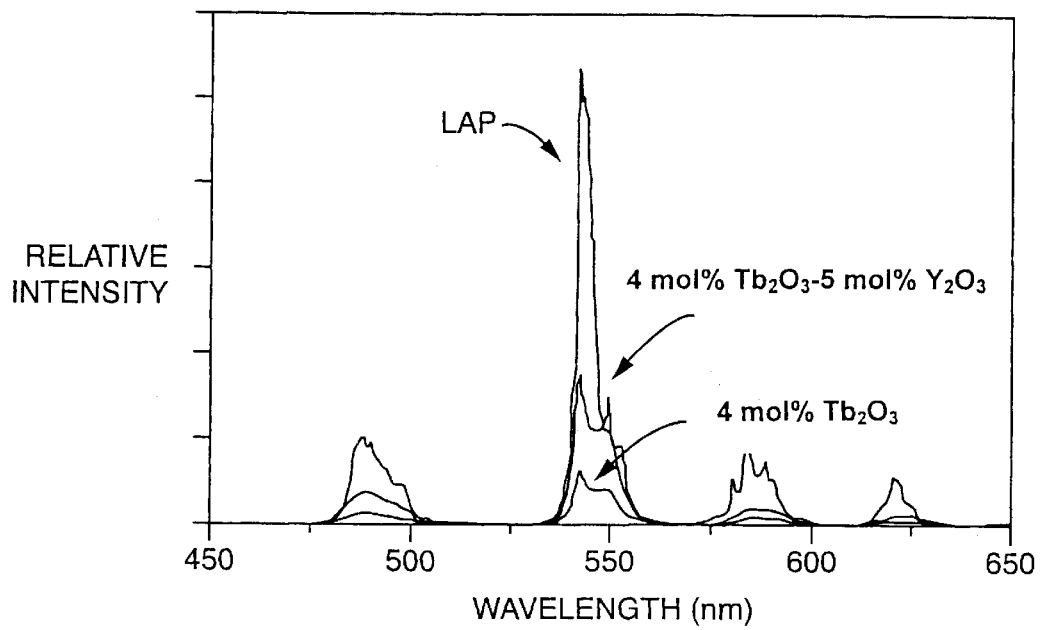
FIG. 3 is a comparison of the emission spectra of Tb and Tb/Y co-doped $SiO_2$ nanoparticles with a conventional green-emitting LAP phosphor under 230 nm excitation.

FIG. 3 shows the emission spectrum of powder plaque samples under 230 nm excitation compared with a standard (La,Ce,Tb)$PO_4$ (LAP) phosphor (OSRAM SYLVANIA Type 2211). The characteristic green $Tb^{3+}$ emission was observed for all samples. The maximum peak intensity for the doped $SiO_2$ nanoparticles is approximately 543 nm with the broad emission profile indicating noncrystallinity.

Figure 4:
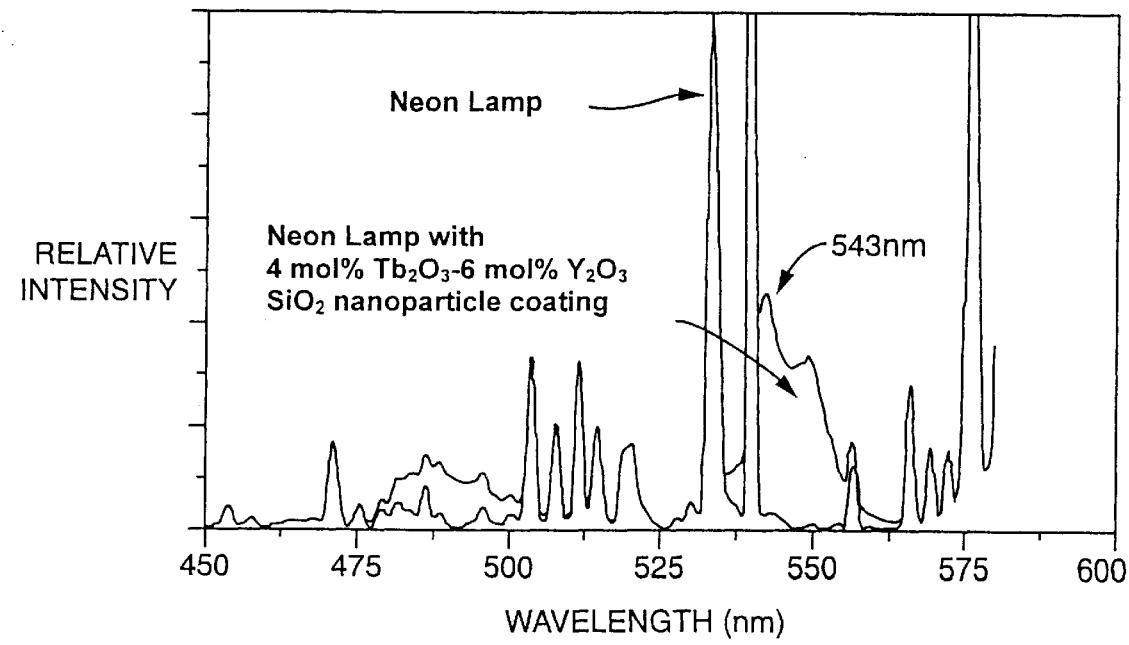
FIG. 4 is an emission spectrum from a neon discharge lamp with and without a coating of Tb/Y co-doped $SiO_2$ nanoparticles.
Figure 5:
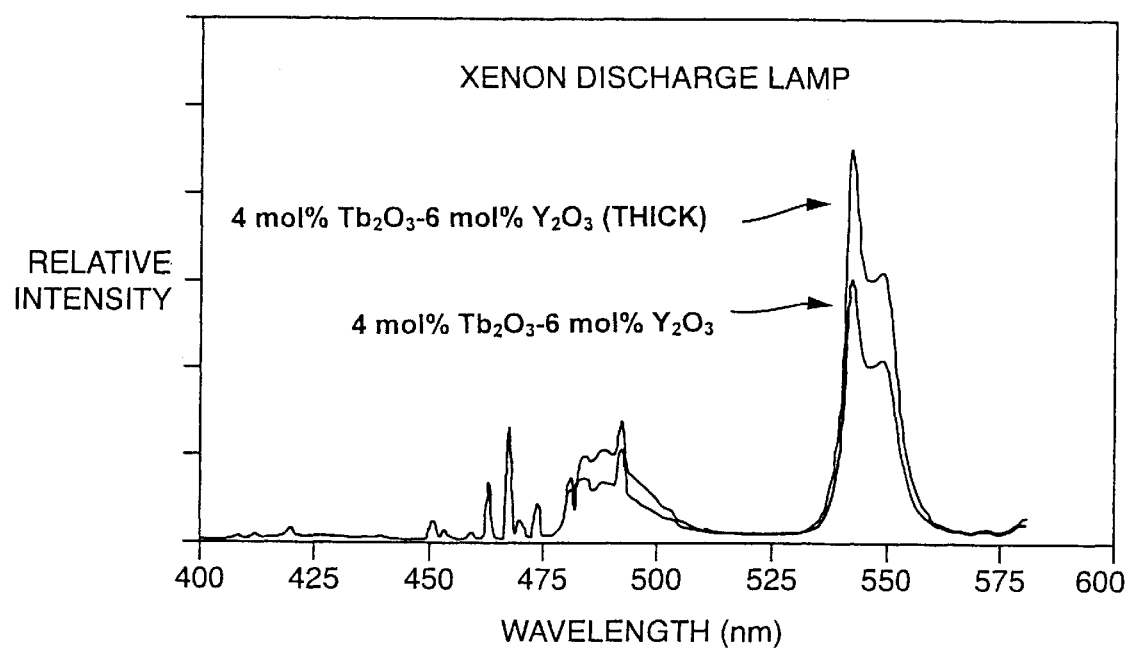
FIG. 5 is an emission spectrum from a xenon discharge lamp having coatings of Tb/Y co-doped $SiO_2$ nanoparticles of different thickness.

FIGS. 4 and 5 show the emission spectra of Tb/Y co-doped $SiO_2$ nanoparticles under neon and xenon gas discharge excitation. The emission spectra were obtained in 10-inch neon lamps with and without a coating of a Tb/Y co-doped $SiO_2$ nanoparticles (4 mol % $Tb_2O_3$, 6 mol % $Y_2O_3$) and having a fill pressure of 200 torr Ne. (FIG. 4) The xenon discharges were obtained in similarly coated 10-inch xenon lamps having a fill pressure of 50 torr Xe. (FIG. 5) In the spectra of both Figures, the characteristic green $Tb^{3+}$ emission is present having a maximum at about 543 nm. Thus, the luminescent nanophase binder of this invention has been shown to emit visible light under both UV and VUV excitation and to promote adherence of the phosphor coating.

While there has been shown and described what are at the present considered the preferred embodiments of the invention, it will be obvious to those skilled in the art that various changes and modifications may be made therein without departing from the scope of the invention as defined by the appended claims.

We claim:

1. A luminescent nanophase binder comprising nanoparticles of a luminescent glass which emit visible light under UV and VUV excitation.

2. The luminescent binder of claim 1 wherein the nanoparticles comprise $SiO_2$ nanoparticles doped with terbium or terbium and yttrium.

3. The luminescent nanophase binder of claim 2 wherein the nanoparticles have a terbium concentration of up to 4 mole percent $Tb_2O_3$ and, optionally, a yttrium concentration of up to 8 mole percent $Y_2O_3$.

4. The luminescent nanophase binder of claim 1 wherein the nanoparticles have a particle size of less than 50 nm.

5. The luminescent nanophase binder of claim 3 wherein the nanoparticles have a particle size of less than 50 nm.

6. A phosphor coating for a lamp comprising: a phosphor and a binder, the binder comprising nanoparticles of a luminescent glass which emit visible light under UV and VUV excitation.

7. The phosphor coating of claim 6 wherein the nanoparticles comprise $SiO_2$ nanoparticles doped with terbium or terbium and yttrium.

8. The phosphor coating of claim 6 wherein the nanoparticles have a particle size of less than 50 nm.

9. The phosphor coating of claim 7 wherein the nanoparticles have a terbium concentration of up to 4 mole percent $Tb_2O_3$ and, optionally, a yttrium concentration of up to 8 mole percent $Y_2O_3$.

10. The phosphor coating of claim 9 wherein the nanoparticles have a particle size of less than 50 nm.

11. The phosphor coating of claim 10 wherein the phosphor is cerium-activated yttrium aluminum garnet.

12. The phosphor coating of claim 11 wherein the binder comprises from 0.5 to 1 weight percent of the coating.

13. A method for coating a lamp comprising forming a colloidal dispersion of $SiO_2$ nanoparticles doped with terbium or terbium and yttrium, combining the colloidal dispersion with a suspension of a phosphor, coating the suspension on the lamp, drying the coating, and firing the coating at a temperature sufficient to remove water and residual organic material.

14. The method of claim 13 wherein the colloidal dispersion is formed by the method comprising:
   (a) dissolving terbium acetylacetonate and, optionally, yttrium acetylacetonate in a mixture of ethanol, water and ammonia; and
   (b) adding tetraethoxysilane to the mixture and stirring the mixture for at least one hour to form the colloidal dispersion.

15. The method of claim 13 wherein the coating is fired at a temperature of 600° C. in air followed by a second firing at a temperature of 750° C. in vacuum or nitrogen.

16. The method of claim 13 wherein the colloidal dispersion is dried and fired to form a powder prior to being combined with the phosphor suspension.

17. The method of claim 13 wherein the nanoparticles have a terbium concentration of up to 4 mole percent $Tb_2O_3$ and, optionally, a yttrium concentration of up to 8 mole percent $Y_2O_3$.

18. The method of claim 17 wherein the nanoparticles have a particle size of less than 50 nm.

19. The method of claim 18 wherein the nanoparticles comprise from 0.5 to 1 weight percent of the coating.

20. The method of claim 15 wherein the nanoparticles have a terbium concentration of up to 4 mole percent $Tb_2O_3$ and, optionally, a yttrium concentration of up to 8 mole percent $Y_2O_3$.

* * * * *